United States Patent
Parry et al.

(10) Patent No.: US 7,639,231 B2
(45) Date of Patent: Dec. 29, 2009

(54) DISPLAY OF A USER INTERFACE

(75) Inventors: Travis Parry, Boise, ID (US); Michael M. Blythe, Albany, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 829 days.

(21) Appl. No.: 11/092,444

(22) Filed: Mar. 29, 2005

(65) Prior Publication Data

US 2006/0230192 A1   Oct. 12, 2006

(51) Int. Cl.
G09G 5/00 (2006.01)
G06F 3/041 (2006.01)

(52) U.S. Cl. ..................... 345/156; 345/173
(58) Field of Classification Search .......... 345/156–184
See application file for complete search history.

(56) References Cited

U.S. PATENT DOCUMENTS

| 7,397,464 B1 * | 7/2008 | Robbins et al. ......... 345/173 |
| 2002/0050983 A1 * | 5/2002 | Liu et al. ............... 345/173 |
| 2006/0161846 A1 * | 7/2006 | Van Leeuwen .......... 715/702 |
| 2006/0209016 A1 * | 9/2006 | Fox et al. .............. 345/156 |

* cited by examiner

Primary Examiner—Jimmy H Nguyen (57) ABSTRACT

Placement of an object on a surface is detected. A user interface corresponding to the object is displayed.

34 Claims, 5 Drawing Sheets

DISPLAY OF A USER INTERFACE

BACKGROUND

Computing devices serving entertainment purposes may lack features sometimes considered desirable. They typically cannot easily interact with other electronic devices that the average consumer owns. For example, home theater personal computers frequently have difficulty communicating with mobile phones, remote controls, and the like. Furthermore, even when the computing devices are able to communicate with such other devices, they many times cannot replace them, so that the user may maintain many different devices, in contradistinction to the potential advantages promised by integrating different types of functionality in one device.

BRIEF DESCRIPTION OF THE DRAWINGS

The drawings referenced herein form a part of the specification. Features shown in the drawing are meant as illustrative of only some embodiments of the present disclosure, and not of all embodiments of the present disclosure.

DETAILED DESCRIPTION OF THE DRAWINGS

In the following detailed description of exemplary embodiments of the present disclosure, reference is made to the accompanying drawings that form a part thereof, and in which is shown by way of illustration specific exemplary embodiments in which the subject matter of the present disclosure may be practiced. These embodiments are described in sufficient detail to enable those skilled in the art to practice the subject matter of the present disclosure. Other embodiments may be utilized, and logical, mechanical, electrical, electro-optical, software/firmware and other changes may be made without departing from the spirit or scope of the present disclosure. The following detailed description is, therefore, not to be taken in a limiting sense, and the scope of the present disclosure is defined only by the appended claims.

Figure 1:
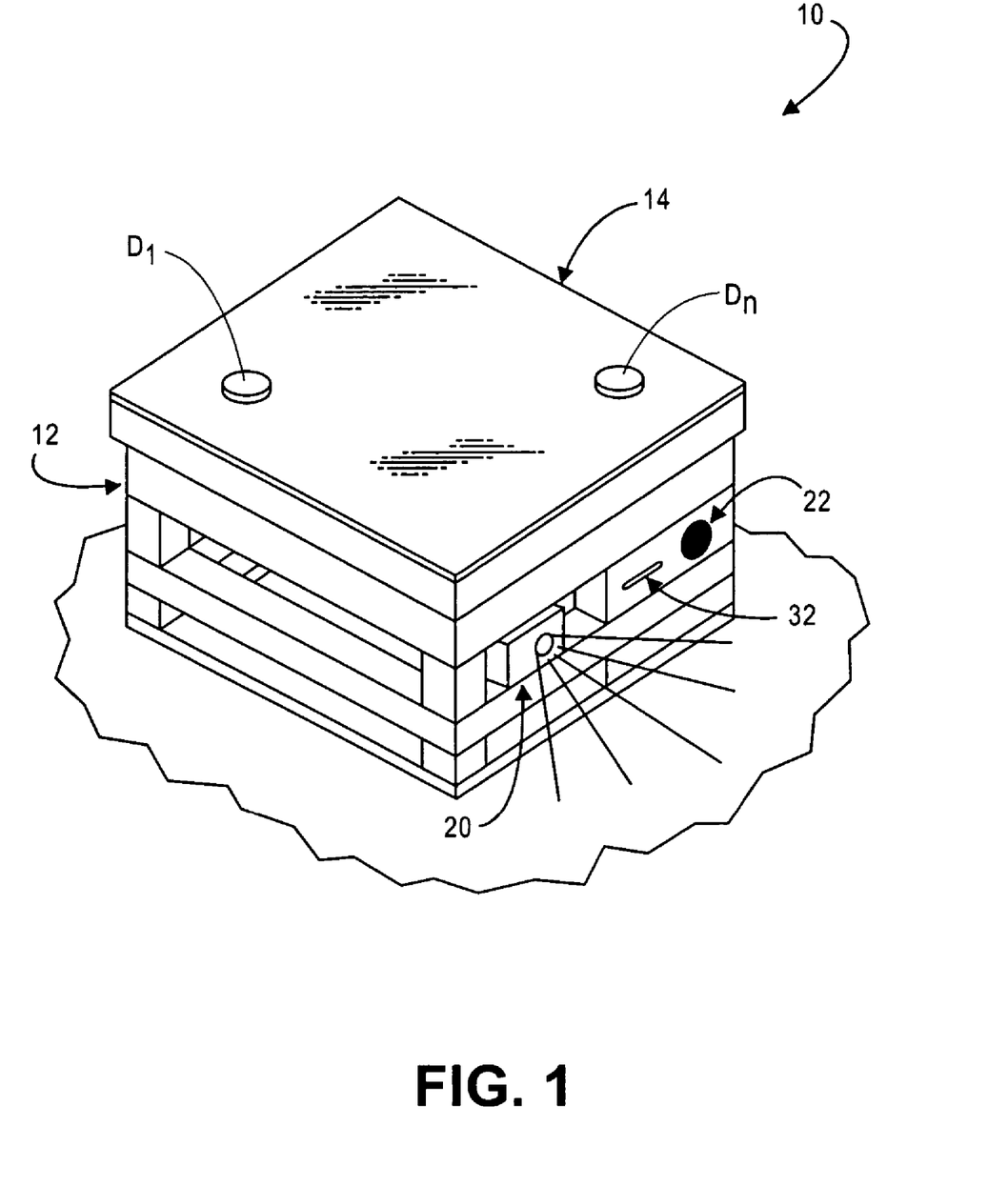
FIG. 1 is a diagram of a perspective view of an embodiment of an interactive display system, according to an embodiment of the present disclosure.
Figure 2:
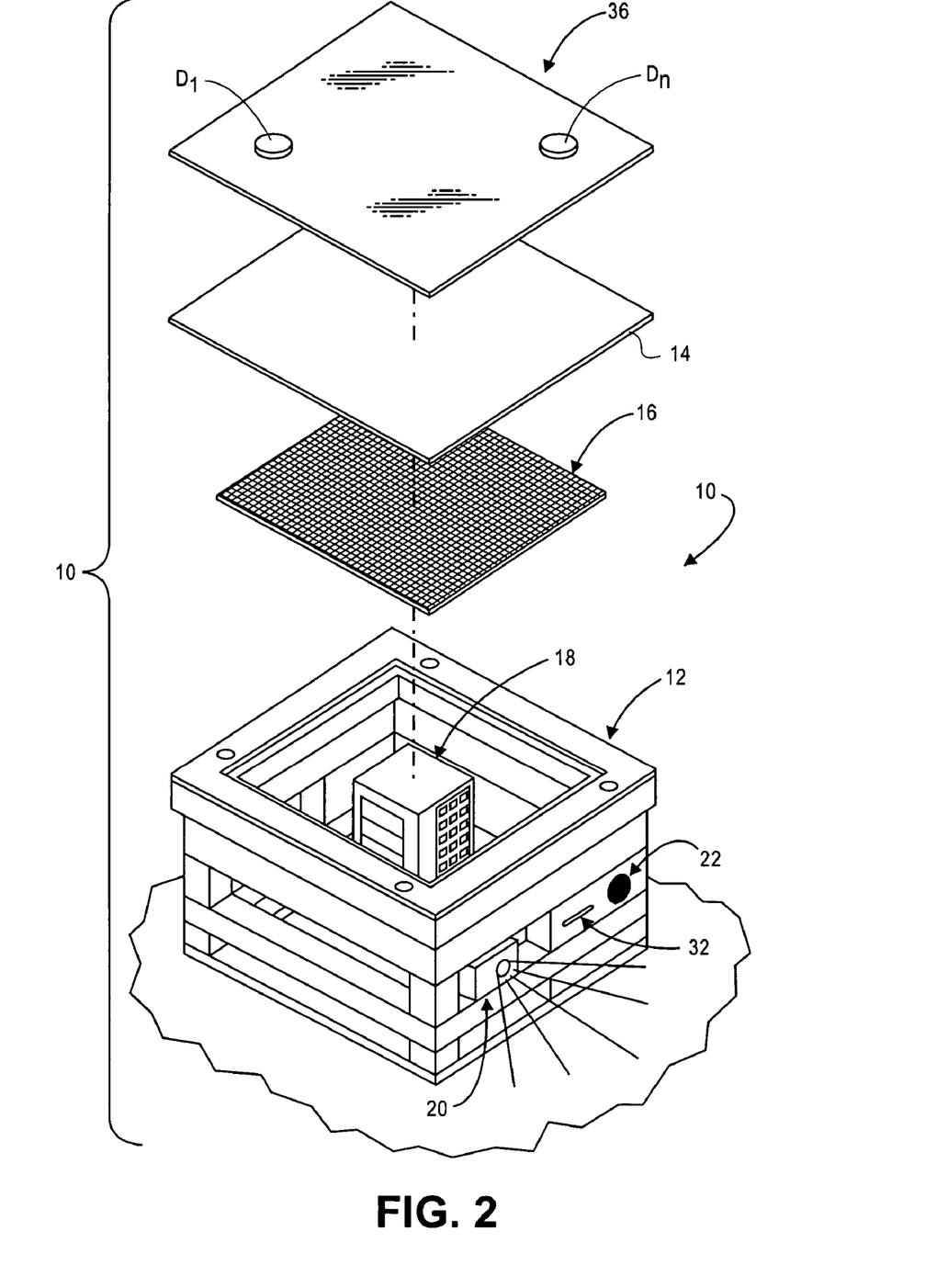
FIG. 2 is a diagram of an exploded view of the embodiment of the interactive display system of FIG. 1, according to an embodiment of the present disclosure.

FIGS. 1 and 2 show an embodiment of a display system, such as interactive display system 10, according to an embodiment of the present disclosure. The interactive display system 10 is depicted in FIGS. 1 and 2 as embodied in a table 12, with the table surface functioning as the display surface 14. Multiple users, each having his or her own data-receiving device D1 through Dn, can view and access the display surface 14 by sitting around the table 12. It is noted that the physical embodiment of the display system 10 can take any number of forms other than that of a table. The interactive display system 10 may be more generally referred to as an electronic device.

The interactive display system 10 can include a display surface 14, a digital light processor (DLP) 16 or other projection or display device, a touch-sensitive surface 36, and a controller 18. The touch-sensitive surface 36 is typically disposed over the display surface 14, such that the devices D1-Dn would be disposed through the surface 36 and onto the display surface 14. According to one embodiment, the controller 18 is configured to generate electrical image signals indicative of viewable images, such as computer programs, movie videos, video games, Internet web pages, and so on, which are provided for generation to the DLP 16. The DLP 16, in response to the electrical signals, generates digital optical (viewable) images that are viewable on the display surface 14. The controller 18 may receive data and other information to generate the image signals from various sources, such as hard disk drives, compact discs (CD's) or digital versatile discs (DVD's) 32, computer servers, local and/or wide area networks, the Internet, and so on. The controller 18 may also provide additional output in the form of projected images from an auxiliary projector 20 and sound from a speaker 22.

As shown in FIGS. 1 and 2, the interactive display system 10 can include a variety of other components, such as a projector 20, configured to simultaneously project the content of the display surface 14 onto a wall-mounted screen, for instance. Alternatively, the projector 20 may display content that is different than the content displayed on the display surface 14. The interactive display system 10 may also include one or more speakers 22 for producing audible sounds that accompany the visual content on the display surface 14. Further, the interactive display system 10 may include one or more devices for storing and retrieving data, such as a CD or DVD drive, hard disk drives, flash memory ports, and so on.

While the interactive display system 10 is described above in the context of a display device including a DLP 16, the systems and methods of embodiments of the present disclosure are not limited to displaying information to a display surface 14 using a DLP 16. Rather, any number of panel display devices having addressable pixels may be used, such as a liquid crystal display (LCD), a plasma display, or another type of flat panel display. The DLP 16 may also assume a variety of forms in differing embodiments of the present disclosure.

In general, the DLP 16 generates a viewable digital image on the display surface 14 by projecting a plurality of pixels of light onto the display surface 14. Each viewable image may be made up of millions of pixels, a fewer number pixels, or a greater number of pixels. Each pixel is individually controlled and addressable by the DLP 16 to have a certain color (or gray-scale). The combination of many light pixels of different colors (or gray-scales) on the display surface 14 generates a viewable image or "frame." Continuous video and graphics may be generated by sequentially combining frames together, as in a motion picture.

One embodiment of a DLP 16 includes a digital micromirror device (DMD) configured to vary the projection of light pixels onto the display surface 14. Other embodiments could include, but are in no way limited to, diffractive light devices (DLD), as well as non-projection-type displays, such as plasma displays, and liquid crystal displays (LCD's).

Additionally, other display technologies could be substituted for the DLP (16) without varying from the scope of the present system and method.

The touch-sensitive surface 36 may in one embodiment of the present disclosure be present to provide the users of the system 10 with a form of user input in addition to and/or in lieu of the devices D1-Dn. The touch-sensitive surface 36 is depicted in FIG. 1 as being separate from the display surface 14, but in another embodiment, it may be integrated with or substitute for the display surface 14. The touch-sensitive surface 36 is sensitive to the placement of physical objects, such as the fingertips of users, and so on, on the display surface 14. The touch-sensitive surface 36 may employ any of a number of different types of touch-detection technology, such as resistive, capacitive, infrared, optical wave, and/or other types of touch-detection technologies. In one embodiment, a back-side imaging camera renders the surface 36 touch sensitive by detecting user input on the surface 36.

Figure 3:
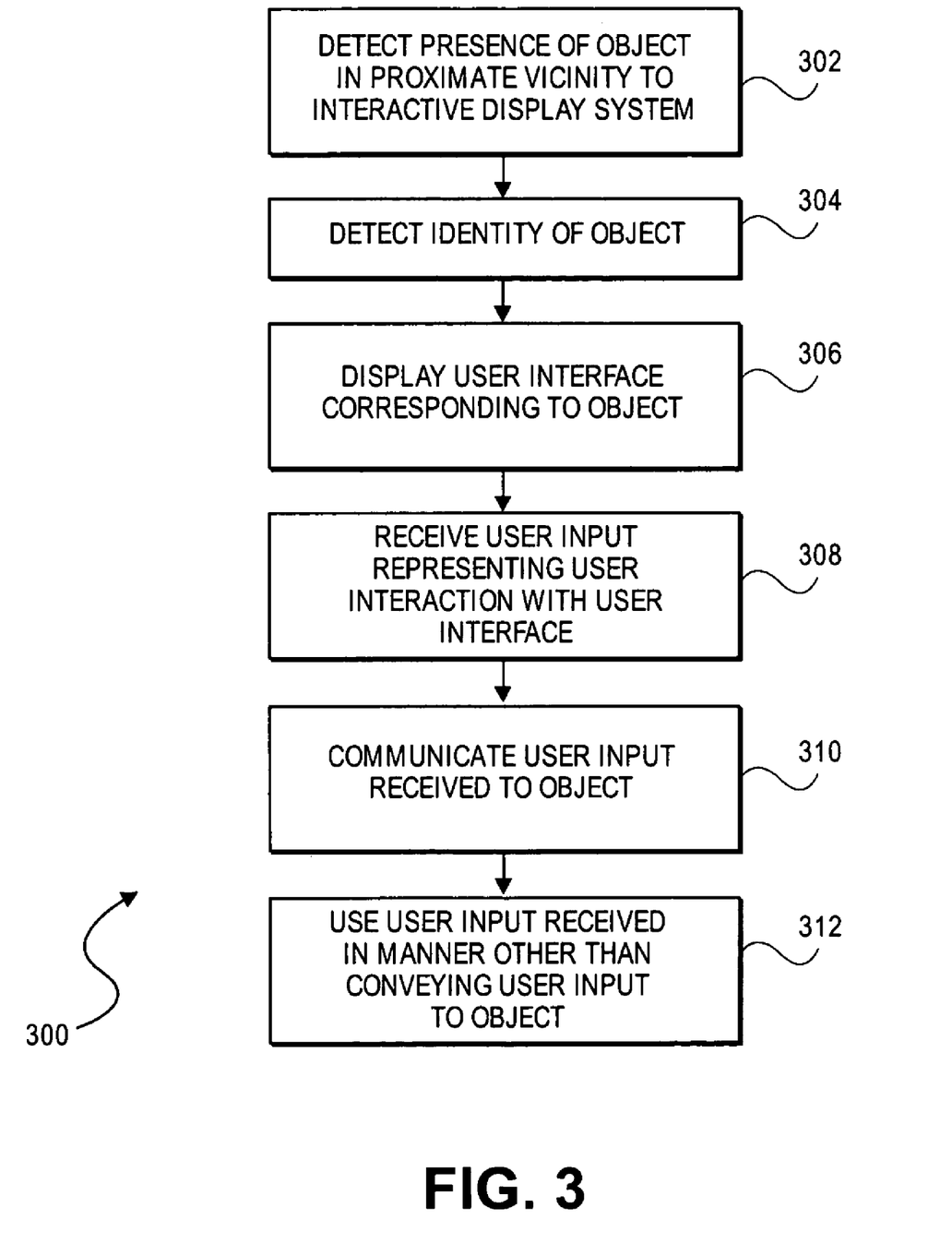
FIG. 3 is a flowchart of an embodiment of a method depicting how an embodiment of an interactive display system can interact with an external physical object, according to an embodiment of the present disclosure.

FIG. 3 shows a method 300 for using the interactive display system 10 that has been described in conjunction with a physical object external to the system 10, according to an embodiment of the present disclosure. At least some parts of the method 300 may be implemented as parts of a computer program stored on a computer-readable medium for execution by the system 10. For example, the computer program parts may be software objects, subroutines, routines, and so on. The computer-readable medium may be a removable or a non-removable medium, and a volatile or a non-volatile medium. The medium may be a semiconductor medium, such as a memory, a magnetic medium, such as a hard disk drive or a floppy disk, and/or an optical medium, such as a CD or a DVD.

The physical object may be an electronic or a non-electronic device. For example, the object may be an electronic device like a cellular phone, a remote control, or another type of electronic device. The object may also be a game piece, like a chess or checkers piece, or another type of non-electronic device. It should be recognized that embodiments of the present disclosure are not limited to the type of physical object that can be used in conjunction with the method 300 of FIG. 3.

The interactive display system 10 detects the presence of the physical object in proximate vicinity to the system 10 (302). That is, the system 10 detects the placement of the physical object on a surface of the system 10. In one embodiment, the object may be placed on the display surface 14 (or the surface 36) of the system 10, such that the touch-sensitive surface 36 thereof detects the presence of the object. In another embodiment, the object may have an optical interfacing mechanism, electrically connective connector, or a radio frequency (RF) transceiver that allows the system 10 to detect the presence of the object, upon placement of the object on a surface of the system 10, which in such an embodiment may or may not be a touch-sensitive surface. In still another embodiment, the object may have a tag or a marking, such as a bar code, that when placed in appropriate proximity to the system 10 allows the system 10 to detect and retrieve the marking, upon placement of the object on a surface of the system 10, which in such an embodiment may or may not be a touch-sensitive surface.

The detection in 302 is accomplished without the interactive display system 10 receiving a video signal from the physical object. This is not to say that the object itself cannot provide such a video signal to the system 10, but only that the video signal is not used by the system 10 to detect the object. For example, a personal digital assistant (PDA) device may be capable of providing a video signal to the system 10. However, such a video signal is not the manner or mechanism by which the system 10 detects the presence of this physical object.

Furthermore, the object may have an infrared port compatible with the Infrared Data Association (IrDA) standard. Placing the infrared port of the object in appropriate proximity to a corresponding port of the system 10 allows the system 10 to detect presence of the object. As another example, a connector of the object may be inserted into a corresponding connector of the system 10 to allow the system 10 to detect presence of the object. As another example, the object may emit RF signals in accordance with a proprietary or non-proprietary standard, such as Bluetooth, 802.11 a/b/g, and so on. The system 10 detects these RF signals in order to detect presence of the object. As another example, a bar code or other tag on the object may be placed in appropriate proximity to a scanning mechanism of the system 10 to allow the system 10 to detect presence of the object.

Furthermore, the interactive display system 10 detects the identity of the object (304), such as the type or class of the physical object that the presence of which has been detected. For example, the system 10 may detect the identity as a particular kind of gaming piece, such as a particular kind of chess piece, or as a particular kind of mobile phone. As another example, the system 10 may be able to detect the particular mobile phone, being able to distinguish between two mobile phones of the same type. Detection of the identity of the object may be accomplished similarly as detection of the presence itself of the object is accomplished.

For instance, the system 10 may be able to discern the identity of the object based on the footprint of the object on the display surface 14 (or on the surface 36), as detected by the touch-sensitive surface 36. The system 10 may alternatively receive communication from the object indicating its identity, such as its type, via infrared communication, wireless communication, direct wired communication, or optically, such as via a camera detecting such identity, such as by using a camera. The system 10 may alternatively still determine the identity of the object by detecting and interpreting a marking on the object, such as a bar code.

The interactive display system 10 next displays a user interface corresponding to the object (306). The system 10 may display the user interface using the DLP 16, such that the user interface is viewable on the display surface 14. Alternatively, or additionally, the system 10 may display the user interface using the auxiliary projector 20, such that one or more users are able to view the user interface as projected on a wall, screen, or other surface external to the system 10.

The user interface, and thus the object itself, may in one embodiment be password protected in one or more forms. For instance, to be able to use the user interface, the proper password would be first entered in by a user. Alternatively, to be able to change the user interface, the proper password would be first entered.

The user interface displayed may take a variety of different forms. Where the physical object itself has a built-in user interface, the display system 10 may display a user interface that is substantially identical to the built-in user interface of the object. For example, cellular phones have a soft-type user interface in that menu items are displayed on built-in screens of the phones. Such menu items can be duplicated in the interface displayed by the display system 10. As another example, remote controls typically have a hard-type user interface in that there are a number of physical buttons on the remote controls. Such physical buttons can be virtually duplicated within the interface displayed by the display system 10.

Furthermore, the display system 10 may display a user interface that provides greater functionality than the user interface of the physical object itself. For example, the physical object may not have a user interface. Therefore, any user interface for the object displayed by the display system 10 inherently has greater functionality than that which the object itself can provide. For instance, a game piece, such as a chess piece, usually does not have a user interface. Therefore, the display system 10 may show as the user interface for this chess piece, the type of chess piece, describe the rules on how and/or where the chess piece can be moved, where it is in relation to other chess pieces on a chess board, and so on. Where the game piece is a role-playing game (RPG) piece, the display system 10 may further show as the user interface how the character represented by the piece can be upgraded or enhanced, and so on.

As another example, rudimentary cell phones may not have built-in address book functionality. Therefore, the display system 10 may show an extended user interface that does have built-in address book functionality for such a cell phone. Using such a cell phone through the display system 10 thus affords the user with the ability to leverage functionality that is otherwise not provided by the cell phone itself.

Figure 4:
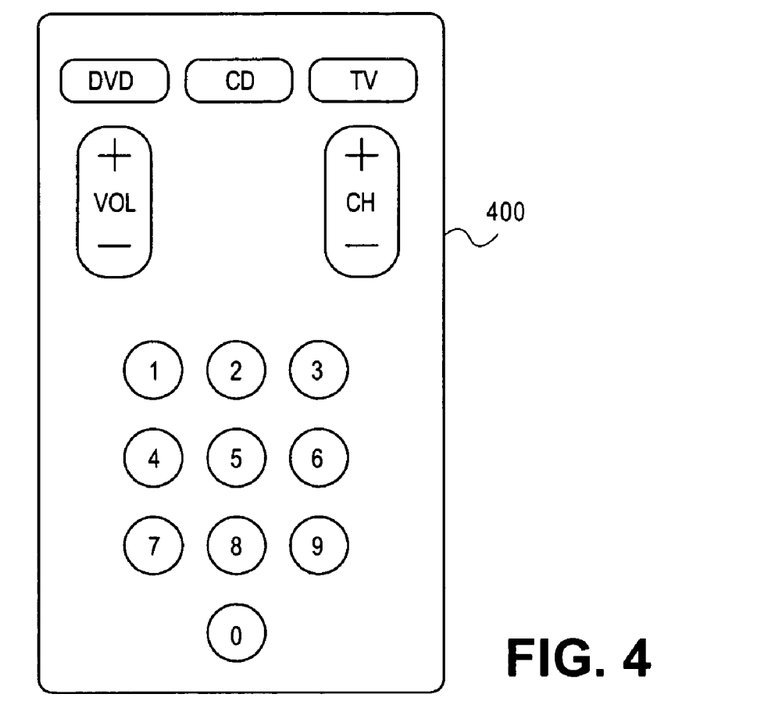
FIG. 4 is a diagram of a representative user interface corresponding to an object as displayed by an embodiment of an interactive display system, according to an embodiment of the present disclosure.
Figure 5:
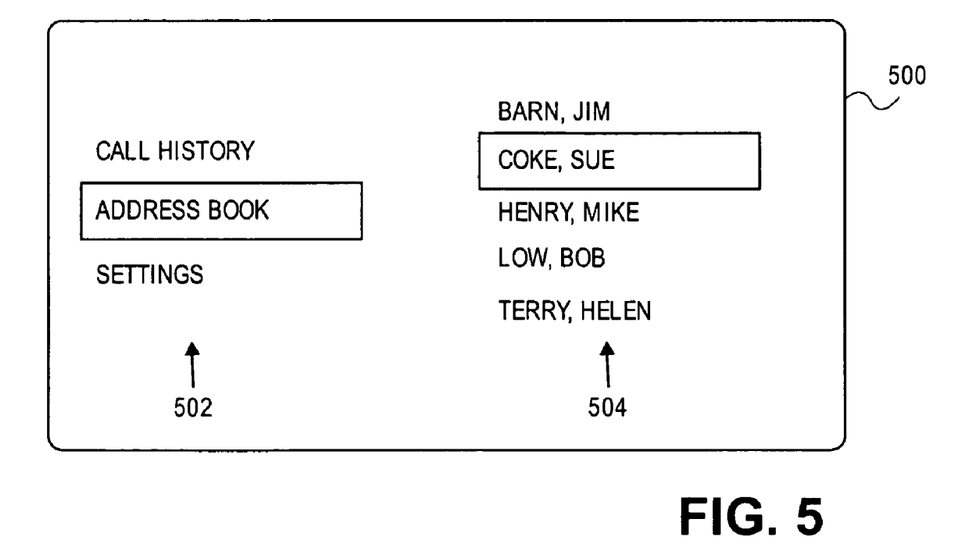
FIG. 5 is a diagram of another representative user interface corresponding to an object as displayed by an embodiment of an interactive display system, according to an embodiment of the present disclosure.

FIGS. 4 and 5 show sample user interfaces that the interactive display system 10 may display for different types of physical objects, according to varying embodiments of the present disclosure. In FIG. 4, the user interface 400 corresponds at least substantially identically to the hard-type user interface of a typical remote control. The remote control may have physical buttons corresponding to selecting DVD, CD, or TV, increasing and lowering the volume, changing the channel, as well as the numbers 0 through 9. The user interface 400 displayed by the display system 10 may therefore, in one embodiment, be substantially similar in function to the physical buttons of the remote control. However, the buttons of the user interface 400 are virtual buttons, since they are displayed by the display system 10, and do not correspond to actual physical buttons or controls of the display system 10.

In FIG. 5, the user interface 500 extends the functionality provided by a rudimentary cellular phone. The cellular phone in question may not have address book functionality, and may have a small or no display. By comparison, the user interface 500 has two columns 502 and 504, whereas the cellular phone may only be able to show one such column of information at a time, if any, and thus provides for a larger user interface than which can be provided by the cellular phone itself. Furthermore, whereas the phone does not have address book functionality, the user interface 500 provides such address book functionality. For instance, by selecting "address book" in the left column 502, the user is presented with a scrollable list of names in the right column 504 from which he or she can select a name having a corresponding phone number to make a phone call.

Referring back to the method 300 of FIG. 3, once the user interface corresponding to the physical object has been display, user input is then received by the interactive display system 10 that represents user interaction with the user interface (308). For example, the user may push virtual buttons of the user interface, or select menu items of the user interface, by using the touch-sensitive surface 36 or the devices D1-Dn of the display system 10. The user input corresponding to user interaction with the user interface may be processed by the display system 10 in at least one of two different ways.

First, the user input may be communicated from the display system 10 back to the physical object (310). As such, the display system 10 is effectively acting as an input device and as a display device for the object. For example, rather than constraining him or herself to a small display with small controls of a physical object like a cellular phone, the user can instead use the larger display and the larger controls of the display system 10 to interact with physical object. As the physical object changes the user interface in response to the user input received, such changes are mirrored on the version of the user interface for the object displayed by the display system 10.

Second, the user input may be used by the display system 10 in a manner other than conveying the input to the physical object (312). As such, the display system 10 can subsume the functionality provided by the physical object, providing that functionality itself without employing the physical object. The electronic device is thus responsive to user interaction with the user interface independent of the object.

For example, in the case of a remote control, the display system 10 in response to user selection of the virtual controls of the user interface provided by the system 10 may appropriately send infrared signals corresponding to those controls without using the remote control itself. The display system 10 may have infrared emitters by which it can send infrared signals to audio/visual components like DVD and CD players without use of the remote control to send the infrared signals.

As another example, in the case of a cellular phone, if the user attempts to place a phone call through the user interface provided by the system 10 and corresponding to the phone, the call may be placed by the display system 10 and not by the cellular phone. For instance, the system 10 may place the call through a standard phone line to which the system 10 is coupled, or over the Internet using voice-over-Internet Protocol (VoIP) technology. As such, a telephone handset may be part of the system 10 for use by the user in making the phone call, or the system 10 may have an integrated microphone to detect speech by the user, and use the speaker 22 to emit sound to the user. Alternatively, the device itself can perform the functionality; for instance, the cellular phone may make the phone call initiated through the user interfaced provided by the system 10 and corresponding to the phone.

Figure 6:
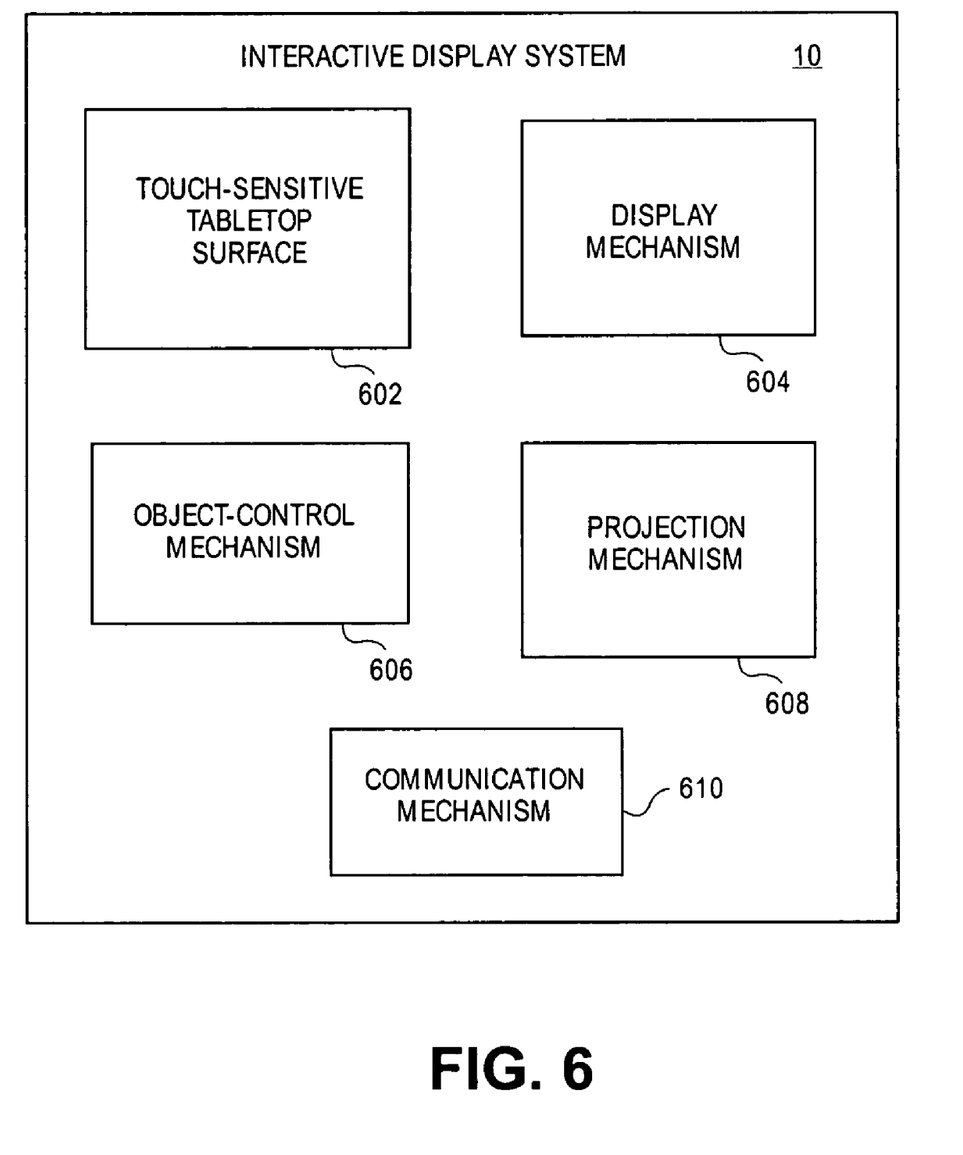
FIG. 6 is a rudimentary block diagram of the embodiment of the interactive display system, according to an embodiment of the present disclosure.

FIG. 6 shows a rudimentary block diagram of an embodiment of the display system 10, according to an embodiment of the present disclosure. The display system 10 is depicted as including a touch-sensitive tabletop surface 602, a display mechanism 604, an object-control mechanism 606, a projection mechanism 608, and a communication mechanism 610. As can be appreciated by those of ordinary skill within the art, the system 10 may have other mechanism, in addition to and/or in lieu of those depicted in FIG. 6. Each of the mechanisms 602, 604, 606, and 608 includes hardware, and may also optionally include software.

The touch-sensitive tabletop surface 602 is substantially transparent and receptive to user touch input. The surface 602 is substantially transparent in that it is able to pass light therethrough. Substantial transparency can include complete transparency, where all such light passes through the surface 602, as well as partial opacity, where some but not all of the light passes through the surface 602. Substantial transparency does not include complete opacity, where little or none of the light passes through the surface 602. The surface 602 may include the display surface 14 and the surface 36 that have been described. The display mechanism 604 is situated underneath or above the surface 602, and is capable of displaying information to one or more users. The display mechanism 604 may include the DLP 16 that has been described.

The object-control mechanism 606 detects presence of an external physical object that is in proximate vicinity to the display system 10. The object-control mechanism 606 also displays a user interface corresponding to the physical object via at least the display mechanism 604, and receives user input via at least the touch-sensitive tabletop surface 602 representing user interaction with the user interface. The mechanism 606 may include the controller 18 that has been described, as well as additional user-input devices, such as the devices D1-Dn. The mechanism 606 may further download information regarding the physical object for display via the display mechanism 604, examples of such information are presented later in the detailed description.

The projection mechanism 608 projects information for external display to the user. The projection mechanism 608 may include the auxiliary projector 20. The object-control mechanism 606 may display the user interface via the projection mechanism 608, either in addition to and/or in lieu of displaying the user interface via the display mechanism 604.

The communication mechanism 610 is to detect the identity and/or presence of the physical object, and/or communicate with the physical object. For example, the communication mechanism 610 may include a transceiver to receive RF communication from and transmit RF communication to the object. The communication mechanism 610 may alternatively include a barcode reader to detect a barcode on the physical object. Where the communication mechanism 610, or in addition to using the communication mechanism 610, the object-control mechanism may detect the presence of a physical object via the touch-sensitive tabletop surface 602.

As can be appreciated by those of ordinary skill within the art, the embodiments described herein can be extended and used in a variety of different applications. For example, the user interface that has been described as being displayed for a detected object may be stored on a different electronic device than that which detects the object. Such a user interface may be stored at a server that is communicatively coupled to the electronic device over the Internet or another type of network. The user is thus able to modify or update the user interface by appropriately logging onto the server, as can be appreciated by those of ordinary skill within the art.

The user interface has been described such that a user is able to interact with the user interface, and the results of such user interactions are directly reflected in the object itself. For instance, the address book of a cellular phone can be modified by the user interacting with the user interface displayed for the cellular phone. The user interface that is displayed may also have different formats among which the user can select, such as different or custom skins, fonts, colors, and so on. The user interface may further may be able to be zoomed in, and out, for increased readability, such as by users having sight-oriented disabilities.

The user interface may also be password protected, as has been noted above, such that certain aspects, attributes, or properties of the object can be modified if the proper password has been entered, while other aspects, attributes, or properties may not be modified without the proper password, or certain portions of the user interface are viewable by a user without entry of the proper password, while other portions of the user interface are not viewable by a user without entry of the proper password. Indeed, the electronic device itself, as well as the object, may have different passwords, such that both passwords may have to be entered in order to view the user interface for the object. Different passwords may correspond to different privilege levels, such that some users can interact with a given object in some limited way, and other users can interact with the object more fully.

The specific types of objects that have been described herein are just examples of the kinds of objects that can be utilized by different embodiments. Other objects and other types and kinds of objects can also be utilized, as can be appreciated by those of ordinary skill within the art, for the same or different types of usage applications and scenarios. For example, a further type of object is a car key, or fob, which upon detection brings up as the user interface for this object the maintenance records for the vehicle with which the key or fob is associated. The electronic device may in such an embodiment be even able to communicate with the vehicle, wirelessly or in a wired manner, to acquire the current information for the vehicle. Such information may include mileage, self-diagnostic information, music stored in the vehicle, navigation information, data transferred to the vehicle at another location, and so on. The user may therefore be able to store and manipulate this information at the electronic device itself, and the electronic device may be programmed to advise and allow appropriate maintenance to be scheduled with local automotive service businesses.

As another example, another type of object is a book. The electronic device may be able to detect the title of the book, such as by reading the ISBN bar code thereof. The text of the book may then be downloaded by the electronic device from a server connected to the Internet or another network. The user would then be able to electronically search the text of the book. Furthermore, notes or comments from others regarding the book may be downloaded, for viewing by the user. Extra content regarding the book may further be downloaded, such as additional information regarding the author thereof, forums in which the user can participate in discussions regarding the book, alternate endings of the book, and so on.

Therefore, it is noted that, although specific embodiments have been illustrated and described herein, it will be appreciated by those of ordinary skill in the art that any arrangement is calculated to achieve the same purpose may be substituted for the specific embodiments shown. This application is intended to cover any adaptations or variations of the present disclosure. Therefore, it is manifestly intended that this present disclosure be limited only by the claims and equivalents thereof.

We claim:

1. A method comprising:
   detecting placement of an object on a surface of an electronic device, the object having a functionality that is performable through the object independently of the electronic device; and,
   displaying a user interface corresponding to the object in response thereto,
   wherein the user interface is for one of:
   using the functionality of the object by the electronic device, such that the functionality is performed by the electronic device in conjunction with the object;
   replicating the functionality of the object by the electronic device, such that the functionality is performed only by the electronic device.

2. The method of claim 1, wherein said detecting placement of the object on the surface comprises detecting placement of the object on the surface of the electronic device, the electronic device displaying the user interface corresponding to the object.

3. The method of claim 1, wherein said detecting the placement of the object on the surface comprises wirelessly detecting the placement of the object on the surface.

4. The method of claim 1, wherein said detecting the placement of the object on the surface comprises detecting placement of the object on a touch-sensitive surface.

5. The method of claim 1, further comprising detecting an identity of the object.

6. The method of claim 5, wherein said detecting the identity of the object comprises at least one of:

receiving communication from the object representative of the identity of the object;

detecting a marking on the object representative of the identity of the object; and, detecting a shape of the object representative of the identity of the object.

7. The method of claim 1, further comprising receiving user input representing user interaction with the user interface.

8. The method of claim 7, further comprising communicating the received user input representing user interaction with the user interface to the object, the electronic device other than the object receiving the user input, such that the electronic device acts as an input device and as a display device for the object.

9. The method of claim 7, further comprising using the received user input representing user interaction with the user interface to perform a function of the object without the object performing the function.

10. The method of claim 1, wherein said displaying the user interface corresponding to the object comprises displaying the user interface on a touch-sensitive display.

11. The method of claim 1, wherein said displaying the user interface corresponding to the object comprises projecting the user interface on an external surface.

12. The method of claim 1, wherein said displaying the user interface corresponding to the object comprises displaying a user interface substantially identical to a user interface provided by the object itself.

13. The method of claim 1, wherein said displaying the user interface corresponding to the object comprises displaying a user interface providing for greater functionality than a user interface provided by the object.

14. An electronic device, comprising:

a display mechanism; and, an object-control mechanism to detect an object placed on a surface of the electronic device and to display a user interface corresponding to the object using the display mechanism, the object having a functionality that is performable through the object independently of the electronic device, wherein the user interface is for one of:

using the functionality of the object by the electronic device, such that the functionality is performed by the electronic device in conjunction with the object;

replicating the functionality of the object by the electronic device, such that the functionality is performed only by the electronic device.

15. The electronic device of claim 14, further comprising a substantially transparent touch-sensitive tabletop surface receptive to user input, the display mechanism situated relative to the touch-sensitive tabletop surface and capable of displaying information to a user, and the object-control mechanism to further receive user input via the touch-sensitive tabletop surface representing user interaction with the user interface.

16. The electronic device of claim 15, wherein the object-control mechanism is to detect the presence of the object via the touch-sensitive tabletop surface detecting placement of the object thereon.

17. The electronic device of claim 14, further comprising a projection mechanism to project information for display to the user, wherein the object-control mechanism is to display the user interface via the projection mechanism.

18. The electronic device of claim 14, further comprising a communication mechanism to detect an identity of the object.

19. The electronic device of claim 18, wherein the communication mechanism comprises a transceiver to receive communication from the object representative of the identity of the object and to transmit communication to the object.

20. The electronic device of claim 18, wherein the communication mechanism comprises one of:

a barcode reader to detect a barcode on the object representative of the identity of the object; and, a camera to detect the identity of the object.

21. The electronic device of claim 14, wherein the object-control mechanism is to communicate the user input received representing user interaction with the user interface to the object, such that the electronic device acts as an input device and as a display device for the object.

22. The electronic device of claim 14, wherein the user interface is substantially identical to a user interface provided by the object itself.

23. The electronic device of claim 14, wherein the user interface encompasses greater functionality than a user interface provided by the object itself.

24. The electronic device of claim 14, wherein the user interface is password-protected by one or more levels of password protection.

25. The electronic device of claim 14, wherein the user interface is user-modifiable.

26. The electronic device of claim 14, wherein the object control mechanism is to download information regarding the object for display by the display mechanism.

27. An electronic device comprising:

means for receiving user input;

means for displaying information; and, means for detecting placement of an object on the electronic device, for displaying a user interface corresponding to the object using the display mechanism, and for receiving user input via the means for receiving user input representing user interaction with the user interface, the object having a functionality that is performable through the object independently of the electronic device, wherein the user interface is for one of:

using the functionality of the object by the electronic device, such that the functionality is performed by the electronic device in conjunction with the object;

replicating the functionality of the object by the electronic device, such that the functionality is performed only by the electronic device.

28. The electronic device of claim 27, further comprising means for projecting information for display to the user.

29. The electronic device of claim 27, further comprising means for detecting an identity of the object.

30. The electronic device of claim 27, wherein the means for detecting the presence of the object, for displaying the user interface, and for receiving the user input is further for communicating the user input received to the object.

31. A computer-readable medium having a computer program stored thereon comprising:

a first computer program part, when executed by an electronic device, causing the electronic device to detect placement of an object on a surface of the electronic device, the object having a functionality that is performable through the object independently of the electronic device; and, a second computer program part, when executed by the electronic device, causing the electronic device to display a user interface corresponding to the object on the electronic device, wherein the user interface is for one of:
- using the functionality of the object by the electronic device, such that the functionality is performed by the electronic device in conjunction with the object;
- replicating the functionality of the object by the electronic device, such that the functionality is performed only by the electronic device.

32. The computer-readable medium of claim 31, the computer program further comprising a third computer program part, when executed by the electronic device, causing the electronic device to receive user input representing user interaction with the user interface.

33. The computer-readable medium of claim 31, wherein the user interface is substantially identical to a user interface provided by the object itself.

34. The computer-readable medium of claim 31, wherein the user interface greater functionality than a user interface provided by the object itself.

* * * * *